United States Patent [19]

Ishiwata et al.

[11] 4,349,513
[45] Sep. 14, 1982

[54] PROCESS FOR RECOVERING URANIUM AND/OR THORIUM FROM A LIQUID CONTAINING URANIUM AND/OR THORIUM

[75] Inventors: Shoji Ishiwata; Yasuo Kuroda, both of Omiya; Shoichi Tanaka, Musashino; Tsuneo Watanabe; Shinichi Hasegawa, both of Ibaragi, all of Japan

[73] Assignee: Mitsubishi Kinzoku Kabushiki Kaisha, Tokyo, Japan

[21] Appl. No.: 146,214

[22] Filed: May 5, 1980

[30] Foreign Application Priority Data

Dec. 25, 1979 [JP] Japan .................... 54/169075

[51] Int. Cl.³ .................. C01G 56/00; C01F 15/00
[52] U.S. Cl. .......................... 423/12; 423/11; 423/15; 423/16; 252/631
[58] Field of Search ............. 423/6, 11, 12, 15, 16, 423/252, 253; 252/301.1 W

[56] References Cited

U.S. PATENT DOCUMENTS

| | | |
|---|---|---|
| 2,839,358 | 6/1958 | Price .................................. 423/16 |
| 2,878,100 | 3/1959 | Googin ............................... 423/16 |
| 3,238,014 | 3/1966 | Gens .................................. 423/16 |

FOREIGN PATENT DOCUMENTS

| | | |
|---|---|---|
| 2308690 | 11/1976 | France . |
| 47-35199 | 9/1972 | Japan . |
| 48-38320 | 11/1973 | Japan . |
| 53-27800 | 3/1978 | Japan . |

*Primary Examiner*—Edward A. Miller
*Assistant Examiner*—J. J. Zimmerman
*Attorney, Agent, or Firm*—Edward J. Brenner

[57] ABSTRACT

A process for recovering uranium and/or thorium from a liquid containing uranium and/or thorium is disclosed, which comprises capturing the uranium and/or thorium in the liquid by an amorphous silica precipitate formed by adding water glass to the liquid, making the captured uranium and/or thorium eluted from the precipitate by acid-treatment, recovering the eluted uranium and/or thorium as an acidic solution, and regenerating the precipitate to water glass by use of an alkali metal hydroxide solution. Thus, the uranium and/or thorium can be recovered in high yield and the amorphous silica precipitate, that is, a formed radioactive solid waste can be remarkably reduced.

1 Claim, 3 Drawing Figures

PROCESS FOR RECOVERING URANIUM AND/OR THORIUM FROM A LIQUID CONTAINING URANIUM AND/OR THORIUM

BACKGROUND OF THE INVENTION

The present invention relates to a process for recovering uranium and/or thorium from a liquid containing uranium and/or thorium which can recover uranium and/or thorium in high yield and can reduce a formed radioactive solid waste remarkably.

The process liquid waste discharged from uranium hexafluoride reconversion process contains 50–200 ppm of uranium and a very small amount of thorium. As a process for removing these radioactive materials from this process liquid waste, the applicant has disclosed a flocculation method using water glass as a flocculant in Japanese Patent Publication No. 38320 of 1973. This method is based on utilization of the characteristics of water glass (sodium silicate) that it becomes an amorphous silica, a polar adsorbent having a large surface area and a high activity, in an ammoniacal solution or an acidic solution and forms a precipitate (hereinafter is referred to as an amorphous silica precipitate) having an excellent filterability and can recover the uranium and/or thorium from the above-mentioned process liquid waste by making these radioactive materials captured by the formed amorphous silica precipitate.

In this process, however, the amorphous silica precipitate capturing, for example, uranium contains consequently 1–3% of uranium, but because of a low price of water glass, this amorphous silica precipitate has been stored up as a radioactive solid waste without any treatment and neither recovery of the captured radioactive materials from the amorphous silica precipitate nor regeneration of the amorphous silica to water glass have been carried out.

On the other hand, as a radioactive waste disposal method, there are at present proposed a sea dumping and a final storage. However, considering that these methods contain still many uncertain factors and are also inevitably very costly, a positive reduction of a formed radioactive solid waste as mentioned above is absolutely necessary and its realization has been strongly demanded.

Under these circumstances, the inventors have confirmed by the result of X-ray diffraction that the precipitate formed by the above-mentioned method using water glass as a flocculant is composed of an amorphous silica and have found out that this amorphous silica can be relatively easily dissolved in an alkali metal hydroxide solution to be regenerated to water glass. Further, they have found out that in the dissolution of the above-mentioned amorphous silica precipitate in the alkali metal hydroxide solution, when the amorphous silica precipitate is previously washed with water thoroughly, the dissolution of the amorphous silica precipitate in the alkali metal hydroxide solution becomes easier and the regeneration of the amorphous silica to water glass proceeds more effectively. They have also found out by their research on the ground of this phenomenon that anions such as $NO_3^-$ contained in the amorphous silica preciptate act as an interfering factor in the regeneration of the amorphous silica to water glass, that is, that as in general an amorphous silica is a polar adsorbent, it does not adsorb anions in itself, but in this case the anions, dissolving in a water layer surrounding the amorphous silica, interfere with the regeneration of the amorphous silica to water glass.

Additionally, they have found out that in dissolving the washed amorphous silica precipitate in the alkali metal hydroxide solution, the amorphous silica can be more easily dissolved in a wet state than in a dried state.

The present invention has been devised on base of these finding of the inventors to meet the above-mentioned demand.

BRIEF SUMMARY OF THE INVENTION

An object of the present invention is to provide a process for recovering uranium and/or thorium from a liquid containing uranium and/or thorium which can recover uranium and/or thorium from the liquid in high yield.

Another object of the present invention is to provide a process for recovering uranium and/or thorium from a liquid containing uranium and/or thorium which can reduce remarkably a formed radioactive solid waste.

According to the present invention, there is provided a process for recovering uranium and/or thorium from a liquid containing uranium and/or thorium comprising adding water glass to a liquid containing uranium and/or thorium in the presence of fluorine and ammonia to make a precipitate composed of an amorphous silica formed and to make said uranium and/or thorium in said liquid captured by said formed precipitate, treating said filtered out precipitate capturing said uranium and/or thorium with acid to make said captured uranium and/or thorium eluted, recovering said eluted uranium and/or thorium as an acidic solution by filtering out said precipitate, washing away anions contained in said filtered out precipitate with water, and dissolving said washed precipitate in an alkali metal hydroxide solution to regenerate said amorphous silica constituting said precipitate to water glass.

The present invention will be better understood from the following detailed description taken in connection with the accompanying drawings in which.

DETAILED DESCRIPTION OF THE INVENTION

Figure 1:
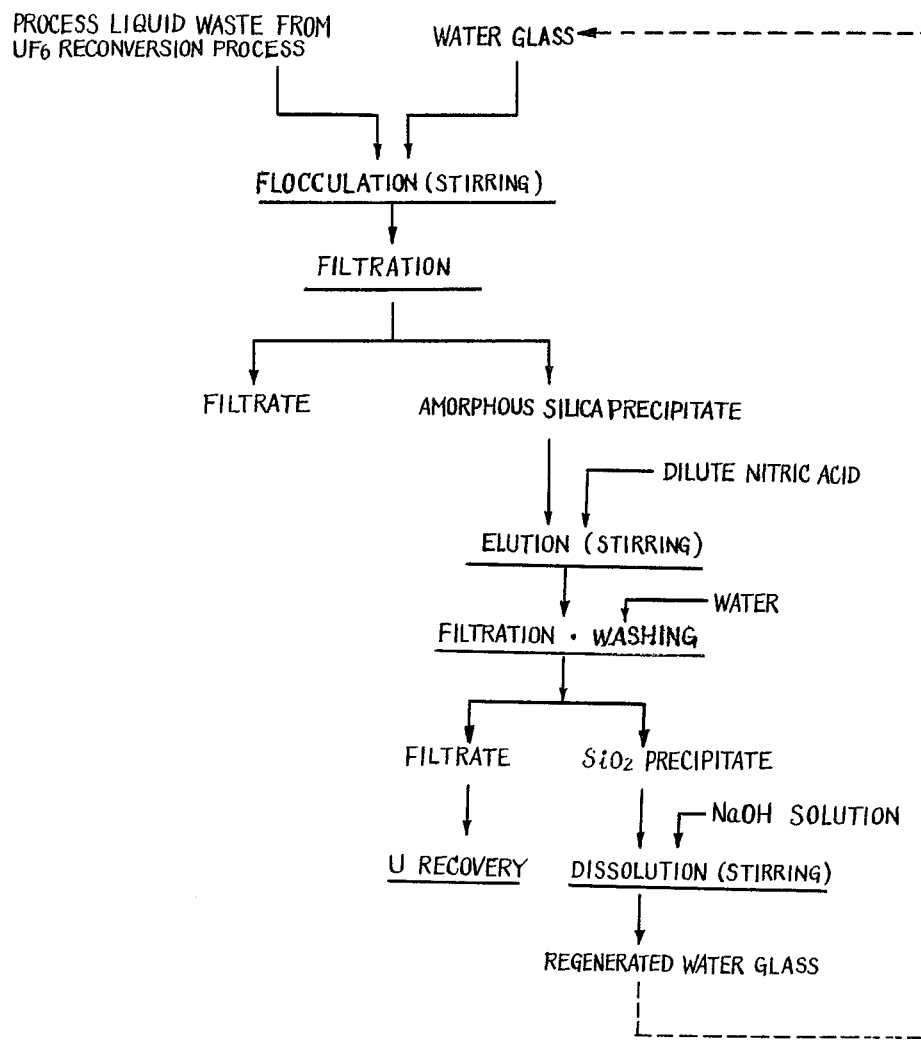
FIG. 1 is a flow sheet of a preferred embodiment of the present invention.

FIG. 1 is a flow sheet of a preferred embodiment of the present invention, in which as a process liquid waste from the uranium hexafluoride reconversion process, a liquid containing only uranium is used. The liquid containing uranium is added with water glass under stirring to make a precipitate formed by flocculation. The formed precipitate is composed substantially of an amorphous silica by which the uranium is captured in an adsorbed state. When the filtered out precipitate is added with acid, for example, a dilute nitric acid at room temperature, stirred, and then filtered out, there is obtained a nitric acid solution as a filtrate in which the uranium is contained in the form of uranyl nitrate. Thus, almost the total amount of the uranium contained in the above-mentioned process liquid waste can be recovered as a nitric acid solution. On the other hand, when the amorphous silica precipitate as a residue is dissolved in an alkali metal hydroxide solution, for example a sodium hydroxide solution, the amorphous silica constituting the precipitate is regenerated to water glass. In this case, as described above, the easier dissolution of the amorphous silica precipitate in the sodium hydroxide solution and the more effective regeneration of the amorphous silica to water glass can be achieved by washing away previously the anions of the amorphous silica precipitate with a sufficient amount of water. Therefore, this washing process is required when the present invention is carried out commercially.

Figure 2:
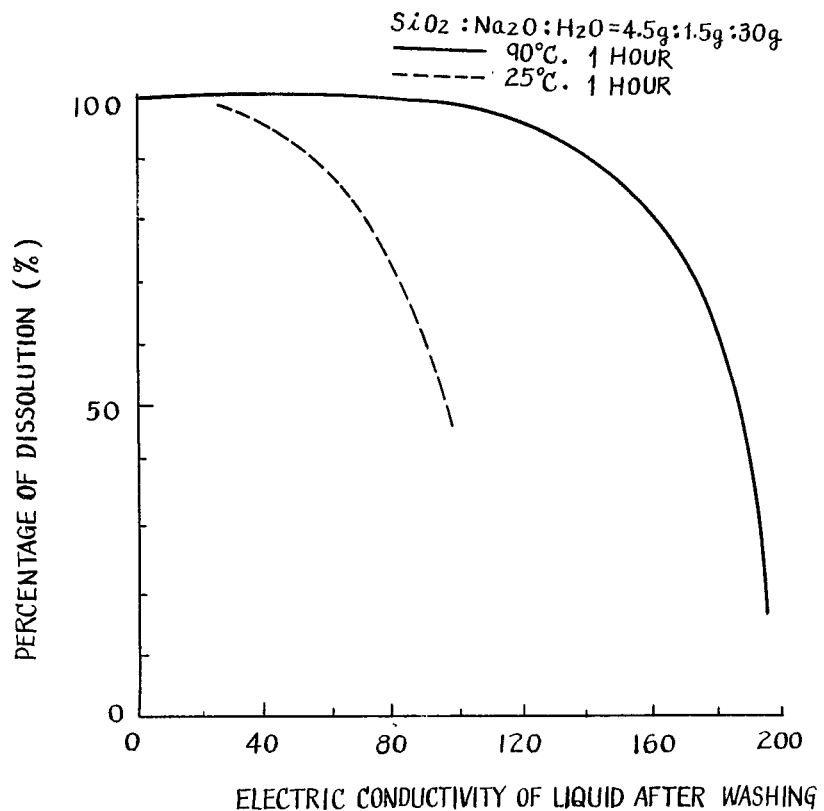
FIG. 2 is a graph representing the relation between an electric conductivity of a liquid after washing the amorphous silica precipitate and a percentage of dissolution of the washed amorphous silica preciptate in a sodium hydroxide solution in the embodiment of FIG. 1.
Figure 3:
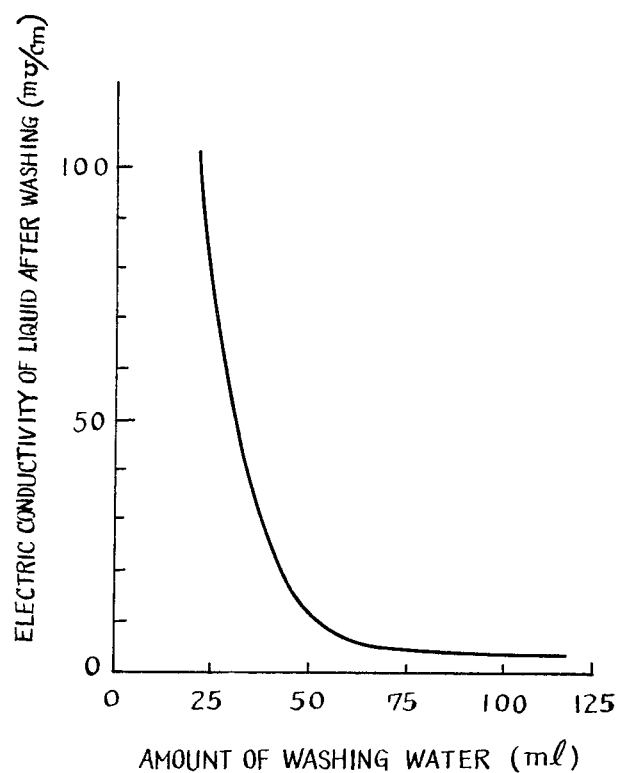
FIG. 3 is a graph representing the relation between an amount of a washing water and the electric conductivity of the liquid after washing the amorphous silica precipitate of FIG. 2.

As for the limit of this washing, it is desirable to be judged, for example, by measuring an electric conductivity of a wash liquid after washing the amorphous silica precipitate. By the results of the research of the inventors, as shown in FIG. 2 and FIG. 3, it has been confirmed that a percentage of dissolution of the washed amorphous silica precipitate in the sodium hydroxide solution increases with decrease of an electric conductivity of the wash liquid, and that the electric conductivity of the wash liquid decreases with increase of the amount of washing water. Incidentally, FIG. 2 is a graph representing the relation between an electric conductivity of a liquid after washing 4.5 g of the amorphous silica precipitate as a residue obtained by filtering out a filtrate containing the uranium eluted by a dilute nitric acid treatment of the amorphous silica precipitate formed in the embodiment of FIG. 1 and a percentage of dissolution of the washed amorphous silica precipitate in a sodium hydroxide solution under $SiO_2$:$Na_2O$:$H_2O$=4.5 g:1.5 g:30 g, that is, a mole ratio of $SiO_2$ to $Na_2O$=3 and respectively at 25° C. for 1 hour and at 90° C. for 1 hour.

Thus, when the amorphous silica precipitate from which the anions are removed by a sufficient water washing is added with an alkali metal hydroxide solution at room temperature under stirring, the amorphous silica is easily dissolved in the alkali metal hydroxide solution to be regenerated to water glass. A mole ratio of the amorphous silica to the alkali metal oxide, that is, $SiO_2/M_2O$ (M:alkai metal) in this case is an important parameter in dissolving the amorphous silica in the alkali metal hydroxide solution to be regenerated to water glass. This mole ratio is preferable to be in the range of 1.5-3.5. Namely, when the mole ratio is above 3.5, the dissolution of the amorphous silica in the alkali metal hydroxide solution takes a long time and a formation velocity of water glass is decreased, while when the mole ratio is under 1.5, the solution becomes strongly alkaline, bringing about a lowering of the economical effects by generating corrosion of the apparatus and requiring a larger amount of the alkali metal hydroxide to be added.

Thus, by treating the amorphous silica precipitate capturing uranium which has been handled as a radioactive solid waste in a manner as described above, the captured uranium can be recovered from the amorphous silica precipitate and the amorphous silica constituting the said precipitate can be regenerated to water glass, thereby making possible to reduce the radioactive solid waste remarkably. Further, as the thus regenerated water glass has an uranium capturing ability of the approximately same level as that of the water glass on the market as shown in the examples, it can be reused as a water glass for capturing uranium in the process of capturing uranium from the above-mentioned process liquid waste containing uranium.

Need or needlessness of a stirring operation and, a stirring velocity in the dissolution of the above-mentioned amorphous silica precipitate in the alkali metal hydroxide solution are determined by a size of a treating vessel and a mole ratio of the amorphous silica to the alkali metal oxide, etc. However, as the amorphous silica precipitate can be dispersed into the alkali metal hydroxide solution finely by stirring and a contact area therebetween can be enlarged, the amorphous silica can be dissolved in the alkali metal hydroxide solution more quickly. Therefore, a stirring operation is desirable in this case.

Further, as to a filtrate obtained in filtering out the amorphous silica precipitate formed by adding water glass to the above-mentioned process liquid waste, the following procedure is carried out. Namely, it is treated with ion exchangers. The treated filtrate is checked for a radioactive concentration and then is sent to a fluorine and ammonia recovering process to be discharged as a final drain.

In the above, there is described mainly the case in which a subject of treatment is a liquid containing uranium, but it is needless to say that the present invention can be also applied to treat each of a liquid containing thorium and a liquid containing uranium and thorium.

The present invention, as described above, can provide a process for treating a radioactive liquid waste which can recover in high yield expensive uranium and/or thorium from the amorphous silica precipitate capturing uranium and/or thorium formed by adding water glass to a radioactive liquid waste containing uranium and/or thorium and can regenerate the amorphous silica constituting the said precipitate to a reusable water glass, thereby bringing about a remarkable reduction of the formed radioactive solid waste leading to a substantial depression of the generation of the radioactive solid waste, therefore it is very useful for treatment of a liquid containing radioactive material and for a solution to the radioactive solid waste formed in the process.

The present invention will be understood more readily with reference to the following examples. The examples, however, are intended to illustrate the present invention and are not construed to limit the scope of the present invention.

EXAMPLE 1

A liquid containing uranium is added with water glass in the presence of fluorine and ammonia to make an amorphous silica precipitate formed. The filtered out amorphous silica precipitate containing 2% of uranium is added with nitric acid at pH 2 under stirring to make the uranium eluted. The eluted uranium is recovered as a nitric acid solution by filtering out the amorphous silica precipitate. Next, the thus filtered out amorphous silica precipitate is washed with water, in order to remove anions contained in the amorphous silica precipitate, until an electric conductivity of the wash liquid after washing decreases to 10 m$\Omega^{-1}$/cm. After that, the thus washed amorphous silica precipitate is dissolved at 25° C. for 10 minutes under stirring in a NaOH solution ($Na_2O$ 2 g/water 30 ml) in which a mole ratio of $SiO_2$/$Na_2O$ is controlled to be 3 to regenerate the amorphous silica to water glass.

In order to confirm a uranium capturing ability of the regenerated water glass, when the regenerated water glass corresponding to 0.7 g of silica is added to 10 l of a solution having an uranium concentration of 60 ppm, it can capture 99.7% of the uranium of the solution.

EXAMPLE 2

A liquid containing thorium is added with water glass in the presence of fluorine and ammonia to make an amorphous silica precipitate formed. The filtered out amorphous silica precipitate containing 1.2% of thorium is added with nitric acid at PH 2 under stirring to make the thorium eluted. The eluted thorium is recovered as a nitric acid solution by filtering out the amorphous silica precipitate. Next, the thus filtered out amorphous silica precipitate is washed with water, in order to remove anions contained in the amorphous silica precipitate, until an electric conductivity of the wash liquid after washing decreases to 10 m$\Omega^{-1}$/cm. After that, the thus washed amorphous silica precipitate is dissolved at 25° C. for 10 minutes under stirring in a NaOH solution (Na$_2$O 2 g/water 30 ml) in which a mole ratio of SiO$_2$/Na$_2$O is adjusted to be 3 to make the amorphous silica regenerated to water glass.

In order to confirm a uranium capturing ability of the regenerated water glass, when the regenerated water glass corresponding to 0.5 g of silica is added to 10 l of a solution having a thorium concentration of 40 ppm, it can capture 99.6% of the thorium in the solution.

What is claimed is:

1. A process for recovering a metal selected from the group consisting of uranium, thorium and mixtures thereof, from a liquid containing said metal comprising the steps of adding water glass to said liquid in the presence of aqueous fluorine and ammonia water to cause a precipitate composed of an amorphous silica to be formed, whereby said metal is absorbed, filtering said precipitate therefrom, treating said filtered precipitate with acid to cause said absorbed metal to be eluted therefrom, filtering said precipitate to recover said eluted metal as an acidic filtrate therefrom, washing away anions of said metal remaining in said filtered precipitate with water, and dissolving said washed precipitate in an alkai metal hydroxide solution to regenerate said amorphous silica constituting said precipitate, to water glass.

* * * * *